United States Patent
Brun et al.

(10) Patent No.: US 9,114,681 B2
(45) Date of Patent: Aug. 25, 2015

(54) SUSPENSION ASSEMBLY FOR AN AUTOMOTIVE VEHICLE AND AUTOMOTIVE VEHICLE COMPRISING SUCH A SUSPENSION ASSEMBLY

(75) Inventors: Stephane Brun, Montceau les mines (FR); Julien Guerra, Lyons (FR)

(73) Assignee: Volvo Trucks AB, Göteborg (SE)

( * ) Notice: Subject to any disclaimer, the term of this patent is extended or adjusted under 35 U.S.C. 154(b) by 0 days.

(21) Appl. No.: 13/578,613

(22) PCT Filed: Feb. 15, 2010

(86) PCT No.: PCT/IB2010/000509
§ 371 (c)(1),
(2), (4) Date: Oct. 9, 2012

(87) PCT Pub. No.: WO2011/098852
PCT Pub. Date: Aug. 18, 2011

(65) Prior Publication Data
US 2013/0193663 A1 Aug. 1, 2013

(51) Int. Cl.
*B60G 7/02* (2006.01)
*B60G 11/12* (2006.01)

(52) U.S. Cl.
CPC *B60G 7/02* (2013.01); *B60G 11/12* (2013.01); *B60G 2202/112* (2013.01); *B60G 2204/121* (2013.01); *B60G 2204/143* (2013.01); *B60G 2204/41* (2013.01); *B60G 2204/4302* (2013.01);
(Continued)

(58) Field of Classification Search
CPC ........ B60G 7/02; B60G 11/12; B60G 11/107; B60G 2204/143

USPC ........ 280/124.128, 124.13, 124.144, 124.175
See application file for complete search history.

(56) References Cited

U.S. PATENT DOCUMENTS 2,308,967 A * 1/1943 Kuss .............................. 403/224
4,478,091 A 10/1984 Forrester
(Continued)

FOREIGN PATENT DOCUMENTS

CA 2281661 C * 10/2005
DE 3824272 A1 1/1977
(Continued)

OTHER PUBLICATIONS

Machine Translation of EP 0556764 [Retrieved Jan. 8, 2014]. EP 0556764 published Aug. 25, 1993.*
International Search Report (Jul. 5, 2010) International application No. PCT/IB2010/000509.

*Primary Examiner* — Paul N Dickson
*Assistant Examiner* — Barry Gooden, Jr.
(74) *Attorney, Agent, or Firm* — WRB-IP LLP

(57) ABSTRACT

A suspension assembly for an automotive vehicle includes a fixed bracket, a suspension arm mounted between two mounting flanges of the bracket, a spacer mounted in a bore of a flange of the bracket, and an articulation shaft mounted through the flanges, the suspension arm and the spacer. The spacer includes an inner ring in which the articulation shaft is mounted An end face of the inner ring is adapted to be pressed, along a longitudinal axis of the shaft, against a lateral face of the suspension arm. The spacer includes, between its inner ring and the bore in which the spacer is mounted, a deformable sleeve, deformable along die longitudinal axis under a shear effort and adapted to slide with respect to the inner ring or to the bracket, along the longitudinal axis.

7 Claims, 3 Drawing Sheets

(52) U.S. Cl.
CPC ......... *B60G 2206/73* (2013.01); *B60G 2300/02* (2013.01)

(56) References Cited

U.S. PATENT DOCUMENTS

| | | | |
|---|---|---|---|
| 6,135,469 A * | 10/2000 | Hulstein et al. .............. 280/86.5 |
| 7,273,218 B2 * | 9/2007 | Shin ....................... 280/124.116 |
| 8,141,896 B2 * | 3/2012 | Simard et al. ................. 280/686 |
| 8,448,964 B2 * | 5/2013 | Bramer et al. ......... 280/124.116 |
| 2003/0098565 A1 * | 5/2003 | Mosler ................... 280/124.175 |
| 2004/0183271 A1 * | 9/2004 | Galazin et al. ......... 280/124.128 |
| 2006/0033300 A1 * | 2/2006 | Shin ....................... 280/124.107 |

FOREIGN PATENT DOCUMENTS

| | | | |
|---|---|---|---|
| DE | 3824272 A1 | 2/1984 | |
| DE | 3824272 A1 | 11/1984 | |
| DE | 3824272 A1 | 3/1990 | |
| EP | 0504593 A1 | 9/1992 | |
| EP | 0556764 A2 | 8/1993 | |
| EP | 2263890 A1 * | 12/2010 | |
| WO | WO 9836922 A2 * | 8/1998 | ............ B60G 11/12 |
| WO | WO 03072377 A1 * | 9/2003 | |

* cited by examiner

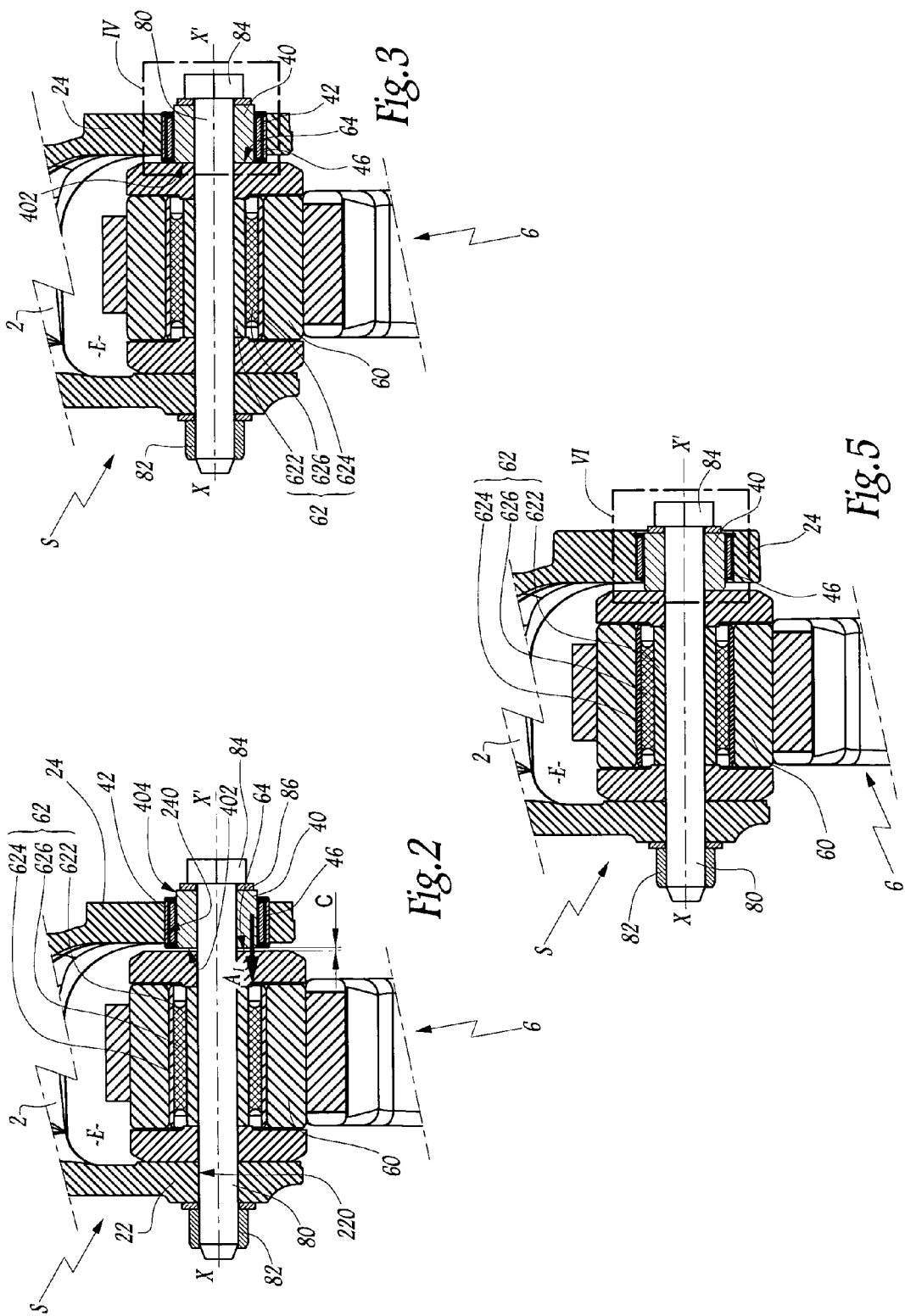

SUSPENSION ASSEMBLY FOR AN AUTOMOTIVE VEHICLE AND AUTOMOTIVE VEHICLE COMPRISING SUCH A SUSPENSION ASSEMBLY

BACKGROUND AND SUMMARY

The present invention relates to a suspension assembly for an automotive vehicle. The invention also concerns an automotive vehicle comprising such a suspension assembly.

Automotive vehicles such as trucks are often equipped with suspension systems using leaf springs. Those leaf springs are bound to the vehicle by spring hangers. A leaf spring is generally articulated on a spring hanger at both ends.

Each spring hanger, also named "bracket", is generally provided with two mounting flanges. A leaf spring, also named "suspension arm", is mounted between the two flanges. As the suspension arm needs to be mounted with a mounting clearance with respect to the bracket on one side of the suspension arm, the space between the flanges of the bracket is larger than the width of the suspension arm. In normal use, no clearance is allowed between the suspension arm and the flanges of the bracket. The suspension arm is bound with the bracket by a bolt mounted through bores in the flanges of the bracket and through the suspension arm. To eliminate the mounting clearance, a spacer is mounted in a bore of one flange and pressed against, a side of the suspension arm, by screwing the bolt.

As the suspension arm transmits high forces, vibrations and displacements to the suspension assembly, the spacer wears the bracket in the contact area with the spacer. Wear on the bores of the bracket leads to greater displacements of the suspension arm with respect to the bracket and to failures.

FR-1 138 218 describes a suspension assembly comprising a bolt mounted through flanges of the bracket and through the suspension arm. Two rubber bushes are mounted, between the bolt and the suspension arm, and pressed against one flange of the bracket by the bolt head. This assembly permits to absorb vibrations between the suspension arm and the bolt and to eliminate the mounting clearance.

However, this assembly does not prevent wear on the bracket provoked by the head of the bolt inserted in the flange of the bracket.

It is desirable to provide a suspension assembly for an automotive vehicle, allowing the mounting of the suspension arm with the mounting clearance and the elimination of the clearance by pressing a movable part against the suspension arm, while preventing this part from provoking wear on the bracket, caused by small displacements of the movable part with respect to the bracket.

To this end, the invention concerns, according to an aspect thereof, a suspension assembly for an automotive vehicle comprising a fixed bracket, a suspension arm mounted between two mounting flanges of the bracket, a spacer mounted in a bore of a flange of the bracket and an articulation shaft mounted through the flanges, the suspension arm and the spacer. This suspension assembly is characterized in that the spacer comprises an inner ring in which the articulation shaft is mounted, in that an end face of the inner ring is adapted to be pressed, along a longitudinal axis of the shaft, against a lateral face of the suspension arm, and in that the spacer comprises, between its inner ring and the bore in which the spacer is mounted, an deformable sleeve, deformable along said longitudinal axis under a shear effort and adapted to slide with respect to the inner ring or to the bracket, along said longitudinal axis.

The sleeve being adapted to slide means that it can be displaced with respect to at least one of the inner ring and of the bracket during the mounting process, so that, from an initial position of the inner ring allowing for a clearance, the inner ring of the spacer can be displaced to a position where it is pressed against a lateral face of the suspension, arm, which can be either a rigid part or a more elastic part such as a leaf spring, by sliding with respect to the deformable sleeve, or by sliding of the deformable sleeve with respect to the bracket. In use, the deformable sleeve absorbs efforts and small displacements of the inner ting with respect to the bracket, along the longitudinal axis of the articulation shaft, without movements at the interfaces between these parts. This prevents wear on the bracket.

According to further aspects of the invention which are advantageous but not compulsory, such a suspension assembly may incorporate one or several of the following features:

The suspension assembly comprises means to block displacements of the deformable sleeve with respect to the inner ring or to the bracket, along the longitudinal axis of the shaft.

The deformable sleeve is blocked in translation with respect to the bracket, along the longitudinal axis of the shaft, by a shoulder of the bore in which the spacer is mounted, this shoulder extending, radially and inwardly, between the deformable sleeve and the suspension arm.

The deformable sleeve is blocked in translation with respect to the bracket, along the longitudinal axis of the shaft, by an elastic ring mounted in a groove of the bore, in which the spacer is mounted, said ring extending, radially and inwardly, between, the deformable sleeve and the suspension arm.

The spacer comprises an outer ring fast with the bore in which the spacer is mounted, whereas the deformable sleeve is mounted .radially between the inner ring and the outer ring.

The deformable sleeve is blocked in translation with respect to the outer ring, along the longitudinal axis of the shaft, by an elastic ring mounted in a groove of the internal, face of the outer ring, said ring extending, radially and inwardly, between the deformable sleeve and the suspension arm.

The deformable sleeve is blocked in translation with respect to the outer ring, along the longitudinal axis of the shall by a shoulder of the outer ring, said shoulder extending, radially and inwardly, between the deformable sleeve and the suspension arm.

Translation of the deformable sleeve, along the longitudinal axis of the shaft, on an opposite side with respect to the suspension arm is blocked by an elastic ring which extends radially and inwardly with, respect to the bore or to the outer ring.

The deformable sleeve is adapted to slide with respect to the outer ring, along the longitudinal axis of the articulation shaft.

The deformable sleeve is blocked in translation with respect to the inner ring, along the longitudinal axis of the shaft, by an elastic ring mounted in a groove of the external surface of the inner ring, said ring extending, radially and outwardly, between the deformable sleeve and the suspension arm.

The deformable sleeve is blocked in translation with respect to the inner ring, along the longitudinal axis of the shaft, by a shoulder of the inner ring, said shoulder extending, radially and outwardly, between the deformable sleeve and the suspension arm.

Translation of the deformable sleeve, along the longitudinal axis of the shaft, on an opposite side with respect to the suspension arm is blocked by an elastic ring which extends radially and outwardly with respect to the inner ring.

The deformable sleeve comprises two coaxial elastic parts, whereas an internal stiffener is inserted between the two parts.

The deformable sleeve is made of polymer material.

The deformable sleeve is made of elastomeric material such as natural or synthetic robber material.

The deformable sleeve is deformable, under a shear effort, in rotation around the longitudinal axis of the articulation shaft.

The invention also concerns, according to an aspect thereof, an automotive vehicle comprising the above-mentioned suspension assembly.

BRIEF DESCRIPTION OF THE DRAWINGS

The invention will now be explained in correspondence with the annexed figures and as an illustrative example.

In the annexed figures:

FIG. 2 is a cross-sectional view of a portion of the suspension assembly of the FIG. 1 in a pre-mounted configuration;

FIG. 3 is a view similar to figure 2 showing the suspension assembly of FIGS. 1 and 2, in a working configuration;

FIG. 5 is a view similar to FIG. 3, showing a second embodiment of an assembly according to the invention, in a working configuration;

FIG. 7 is a very schematic curve of a friction effort exerted by a deformable sleeve of a suspension assembly according to the invention, versus displacement of a surface with which the

DETAILED DESCRIPTION

Figure 1:
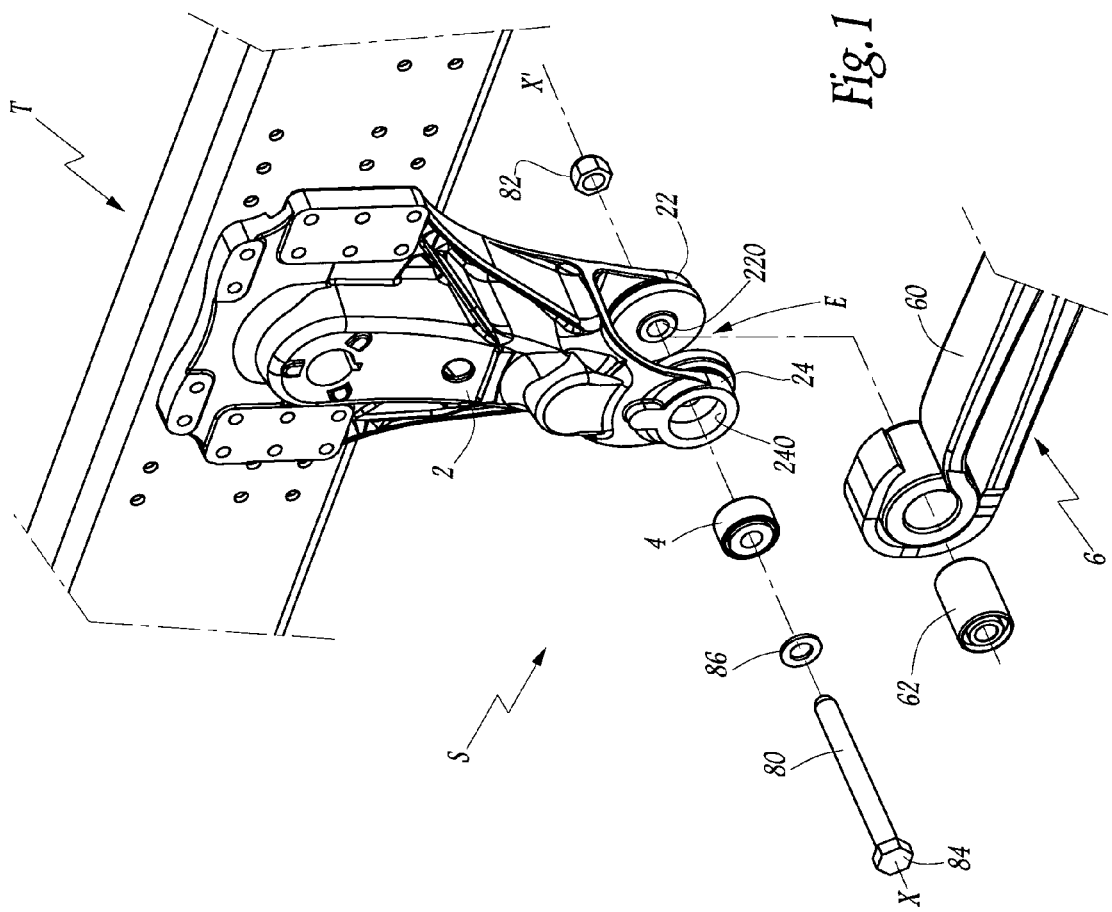
FIG. 1 is a partially exploded perspective view of a first embodiment of a suspension assembly according to the invention, bounded to a chassis of an automotive vehicle.

An automotive vehicle, such as a truck T, is provided with several suspension assemblies S. As shown on FIG. 1, a suspension assembly S is fixed to the chassis of truck T. The suspension of truck T can include a leaf spring 60 and pneumatic suspensions (not shown).

The suspension assembly S comprises a bracket 2, also named spring hanger.

Bracket 2 is provided with two mounting flanges 22 and 24, which are substantially parallel to each other. A mounting space E extends between flanges 22 and 24.

Each of flanges 22 and 24 comprises a bore 220 and 240, drilled along an axis X-X'.

Bore 240 is adapted to receive a spacer 4.

Suspension assembly S comprises a suspension arm 6, which may include a leaf spring 60. At an end adapted to be mounted in the bracket 2, leaf spring 60 is rolled around an inner core 62. Inner core 62 comprises two coaxial rings 622 and 624 separated by an elastic part 626. Inner core 62 is adapted to be aligned with axis X-X' between flanges 22 and 24. The elastic part permits rotation of suspension arm 6 around axis X-X', with respect to bracket 2.

In the shown embodiment, a wear washer is provided on each side of the spring and inner core assembly so as to avoid direct contact with the corresponding internal surface of the bracket flanges.

An articulation shaft 80, which can be a bolt, is mounted, along axis X-X', through bore 240 of flange 24, through spacer 4, through inner core 62 of suspension arm 6, through bore 220 of flange 22 and through both wear washers, and screwed in a nut 82 on an opposite side of bracket 2 with respect to the head 84 of articulation shaft 80.

Axis X-X' is also the longitudinal axis of articulation shaft 80.

Spacer 4 composes an inner ring 40 and an outer ring 42. Inner ring 40 is adapted to be mounted on articulation shaft 80. Outer ring 42 is adapted to be press fitted, in bore 240 of mounting flange 24. The head 84 of articulation shaft bears on the inner ring 40. A washer 86 is inserted between head 84 of articulation shaft 80 and inner ring 40. The nut 82 bears on the external surface of bracket flange 22 so that, when, when the bolt is tightened, it tends to tighten the inner ring 40, the wear washers, the suspension arm 6 and the inner core 62 against the internal surface of the bracket flange 22. It can be noted, that the wear washers are designed so as to bear only against the inner ring 622 of the inner core 62, on both sides thereof. To the contrary, the suspension arm and the outer ring 624 of the inner core 62 are preferably received with a clearance along direction X-X between the wear washers, so that, the rotation of the suspension arm. is not hindered despite the fact that it is tightened along direction X-X against the bracket flange 22.

Between inner ring 40 and outer ring 42, spacer 4 comprises a deformable sleeve 44, which is coaxial with inner and outer rings 40 and 42. Deformable sleeve 44 comprises an inner surface 444 and an outer surface 446. "Deformable" refers to the property of sleeve 44 to allow, by a mere deformation, of the sleeve, preferably substantially reversible, a relative translation displacement between its inner and outer surfaces 444 and 446, under the normal operating conditions. This displacement between inner and outer surfaces 444, 4446 is preferably at least equal to the displacement which may occur between inner ring 40 and outer ring 42, in use of truck T. This deformation should induce shear forces sufficiently low so that, in use of the truck, i.e. after the mounting process, the deformation of the sleeve may occur without any sliding of the inner and outer surfaces of the sleeve with respect to the adjacent part. This deformable sleeve 44 is made of a deformable material, which can be for instance a polymer material, for example an elastomeric material such as a natural or synthetic rubber.

Figure 7:
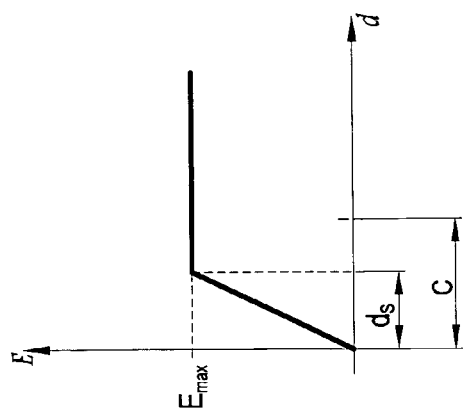

As shown schematically on FIG. 7, deformable sleeve 44 is deformable under a shear effort provoked by a shear displacement d between inner ring 40 and outer ring 42 until a maximum shear displacement value ds is reached. Value ds depends inter alia on the stiffness of the deformable material and the roughness of an external surface 404 of inner ring 40, on which sleeve 44 is mounted. Before value ds is reached, friction effort E of sleeve 44 on external surface 404 increases proportionally to displacement d, the displacement being then in fact the displacement between the inner and outer surfaces of the deformable sleeve. When value ds is reached, friction effort E reaches a maximal value Emax corresponding to the point where the sleeve will start to slide with respect to at least one of the adjacent parts. Stiffness of deformable sleeve 44 perpendicularly to axis X-X' is high enough to minimize displacements of inner ring 40 with respect to bracket 2 in this direction.

Figure 4:
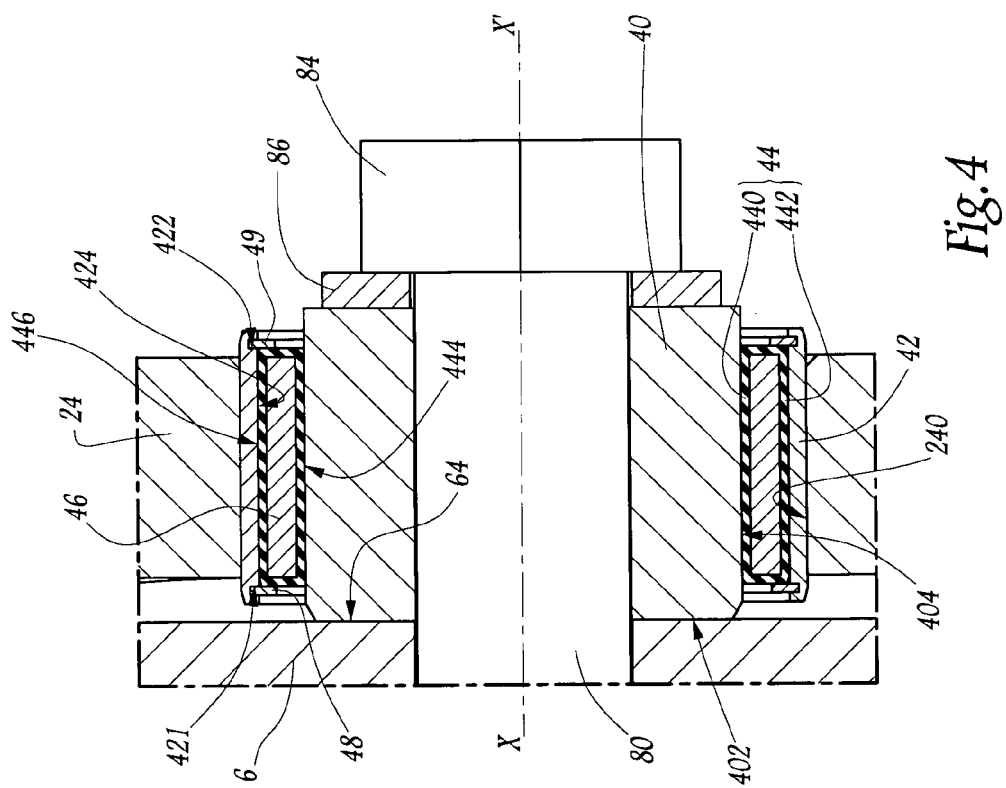
FIG. 4 is a view, at a larger scale, of detail IV on FIG. 3.

As shown on figure 4, deformable sleeve 44 may comprise two or more coaxial deformable pans 440 and 442, separated by one or more annular stiffener 46 extending along axis X-X'. Stiffener 46 can be made of a metallic material. Stiffener 46 is here represented covered on both ends by elastic parts 440 and 442 radially joining each other. In an alternative embodiment, stiffener 46 extends up to at least one lateral end of sleeve 44.

In the shown embodiment, translation of deformable sleeve 44 with respect to outer ring 42, along axis X-X', is blocked in both directions by two elastic rings 48 and 49. Elastic rings 48 and 49 are mounted in grooves 421 and 422 on the internal surface 424 of outer ring 42. Elastic ring 48 is placed between deformable sleeve 44 and suspension arm 6. Both elastic rings 48 and 49 extend radially an inwardly towards inner ring 40.

In a different embodiment which is not represented on the figures, elastic ring 48 can be replaced by a radially and inwardly extending shoulder of outer ring 42.

When suspension arm 6 has to be mounted in mounting space E of bracket 2, it is compulsory to leave a mounting clearance C between one of the lateral faces of suspension arm 6 and one of flanges 22 and 24. As represented on figure 2, mounting clearance C extends between a lateral face 64 of suspension arm 6 and an end face 402 of inner ring 40. In use, there must be no more such clearance. Articulation shaft 80 is screwed in nut 82 in order for head 84 to push inner ring 40 of spacer 4, along axis X-X', toward lateral face 64, along the direction of arrow on FIG. 2. As deformable sleeve 44 is blocked by elastic ring 48, movement of inner ring 40 provokes a shear effort and a deformation of sleeve 44, along axis X-X'. As clearance C is higher than maximum shear displacement ds, shear effort exceeds maximal friction effort Emax of sleeve 44 on inner ring 40 when value ds is reached. Inner ring 40 begins to slide with respect to deformable sleeve 44 until end face 402 of inner ring 40 meets lateral face 64 of suspension arm 6.

In this configuration, represented at FIG. 3, there is no more clearance between suspension arm 6 and bracket 2, as end face 402 is pressed against lateral face 64 by head 84 of articulation shaft 80.

When truck T is in use, deformable sleeve 44 absorbs shear efforts and small displacements along axis X-X' of inner ring 40 with respect to bracket 2, provoked by deformations of suspension assembly S in use. In normal, operating conditions, these displacements are limited in an accepted range which allows displacements of the inner and outer surfaces 444 and 446 of deformable sleeve 44 between each other, while inner surface 444 substantially does not move with respect to external surface 404 and outer surface 446 substantially does not move with respect to internal surface 424. Small rotational displacements of inner ring 40 around axis X-X' with respect to bracket 2 are absorbed in the same manner by deformable sleeve 44, thanks to the fact that sleeve 44 is also deformable, under a shear effort, in rotation around axis X-X'.

Displacements of articulation shaft 80 with respect to bore 240 perpendicularly to axis X-X' are blocked by stiffener 46, Stiffener 46 can be replaced by a multi-layered sandwich construction of deformable sleeve 44, alternating metal layers and deformable layers.

Figure 6:
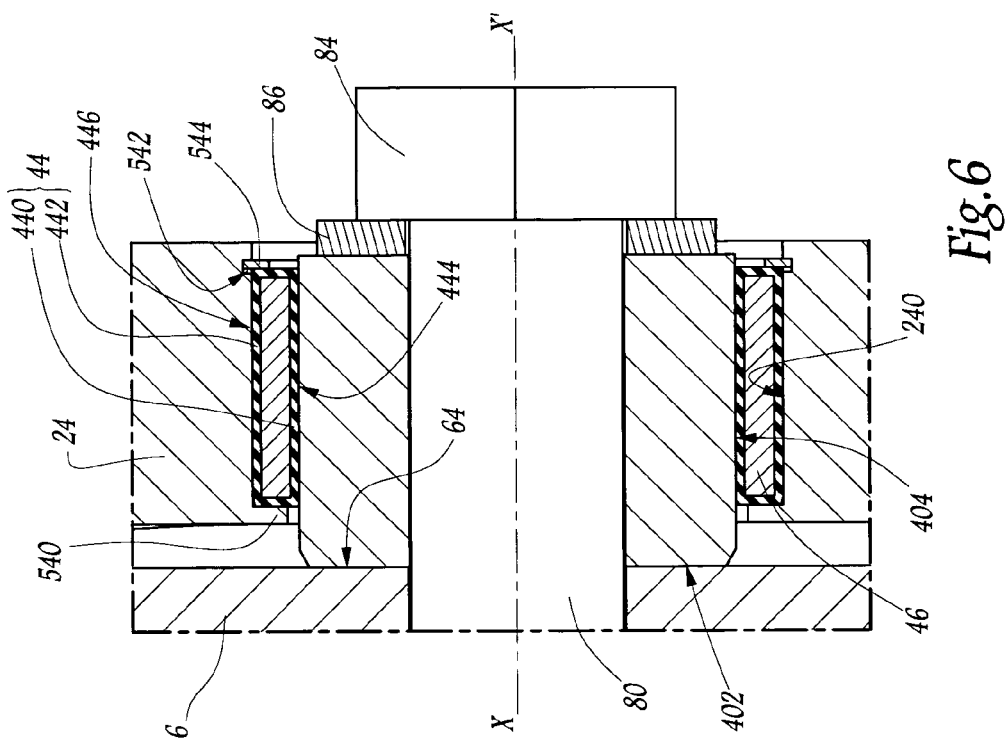
FIG. 6 is a view, at a larger scale, of detail VI on FIG. 5.

According to a second embodiment of the invention represented on FIGS. 5 and 6, spacer 4 does not comprise any outer ring 42. Deformable sleeve 44 is directly in contact with bore 240 of flange 24. Bore 240 comprises a shoulder 540, extending radially and inwardly towards axis X-X'. This shoulder 540 blocks translation of deformable sleeve 44 with respect to bracket 2 along axis X-X' and is therefore placed between deformable sleeve 44 and lateral face 64 of suspension arm 6. On its opposite side with respect to shoulder 540, bore 240 comprises a groove 542. An elastic ring 544 similar to elastic ring 49 is mounted in groove 442 to block translation of deformable sleeve 44 with respect to bracket 2 along axis X-X'.

In this embodiment, mounting of suspension arm 6 in mounting space E of bracket 2 is realized in the same way as in the first embodiment.

In another embodiment, which is not represented on the figures, shoulder 540 on bore 240 is replaced by an elastic ring similar to elastic ring 48. In that case, another groove similar to groove 542 is provided on bore 240.

More generally, translations of deformable sleeve 44 along axis X-X' with respect to outer ring 42 or bracket 2 can be blocked by respective adhesions of sleeve 44 to internal surface 424 or bore 240, or by any other blocking means.

In another embodiment, which is not represented on the figures, deformable sleeve 44 is made of one piece and does not comprise an internal stiffener. The presence or not of stiffener 46 depends on the type of use of the vehicle on which suspension assembly S is mounted. In fact, the size of spacer 4 and more particularly deformable sleeve 44 depends on efforts, displacements and vibrations that suspension arm 6 is expected to transmit to spacer 4.

In a further embodiment not represented on the figures, the operation of suspension assembly S may be inverted in the following way; while mounting the assembly, instead of sliding with respect to inner ring 40, deformable sleeve 44 may slide with respect to bracket 2 or to outer ring 42. Therefore, external surface 404 of inner ring 40 should preferably comprise means to block translation of deformable sleeve 44 with respect to inner ring 40, such as, for instance, adhesion and/or shoulders and/or elastic rings.

In other words, in such a case, the structures mentioned here-above and/or on the figures for the interface between sleeve 44 and outer ring 42, or for the interface between sleeve 44 and bore 240 can be used at the interface between sleeve 44 and inner ring 40, in ease a sleeve 44 is adapted to slide axially with respect to outer ring 42 or to bore 240.

Technical features of the embodiments described before can be mixed in the scope of the invention.

The invention claimed is:

1. Suspension assembly for an automotive vehicle, comprising:
    a fixed bracket,
    a suspension arm mounted between two mounting flanges of the bracket, and
    a spacer mounted in a bore of one of the two mounting flanges of the bracket, an articulation shaft mounted through the flanges, the suspension arm and the spacer,
    wherein:
    the spacer comprises an inner ring in which the articulation shaft is mounted, an outer ring press fitted in a bore of one of the two mounting flanges,
    an end face of the inner ring is adapted to be pressed, along a longitudinal axis of the shaft, against a lateral face of the suspension arm, and
    the spacer comprises, between the inner ring and the outer ring, a deformable sleeve, the deformable sleeve being deformable along the longitudinal axis under a shear effort, wherein the deformable sleeve absorbs displacements, along the longitudinal axis, of the inner ring with respect to the bracket, wherein the deformable sleeve comprises at least a first and a second coaxial deformable pan and a stiffener between the first and the second pan, the first pan being disposed annularly inside the stiffener and the stiffener being disposed annularly inside the second pan.

2. Suspension assembly according to claim 1, wherein the deformable sleeve is blocked in translation with respect to the outer ring, along the longitudinal axis of the shaft:

by an elastic ring mounted in a groove of the internal face of the outer ring, the elastic ring extending, radially and inwardly, between the deformable sleeve and the suspension arm; or by a shoulder of the outer ring, the shoulder extending, radially and inwardly, between the deformable sleeve and the suspension arm;

or by adhesion.

3. Suspension assembly according to claim 1, wherein the spacer comprises an outer ring fast with the bore in which the spacer is mounted, and wherein the deformable sleeve is mounted radially between the inner ring and the outer ring, and the deformable sleeve is adapted to slide with respect to the outer ring, along the longitudinal axis of the articulation shaft.

4. Suspension assembly according to claim 1, wherein the deformable sleeve is made of polymer material including at least one of natural or synthetic rubber material.

5. Suspension assembly according to claim 1, wherein the deformable sleeve is deformable, under a shear effort, in rotation around the longitudinal axis of the articulation shaft.

6. Automotive vehicle comprising a suspension assembly according to claim 1.

7. Suspension assembly according to claim 1, wherein the deformable sleeve is in contact with a cylindrical surface of the inner ring, or a cylindrical surface that is connected to the inner ring, and with a cylindrical surface of the bracket, or a cylindrical surface that is connected to the bracket.

* * * * *

UNITED STATES PATENT AND TRADEMARK OFFICE
CERTIFICATE OF CORRECTION

PATENT NO.      : 9,114,681 B2
APPLICATION NO. : 13/578613
DATED           : August 25, 2015
INVENTOR(S)     : Stephane Brun et al.

It is certified that error appears in the above-identified patent and that said Letters Patent is hereby corrected as shown below:

On the Title Page, Item (75) Inventor
Change the spelling of the city for inventor Julien Guerra from "Lyons" to --Lyon--.

Signed and Sealed this
Twenty-second Day of December, 2015

Michelle K. Lee
*Director of the United States Patent and Trademark Office*